(12) United States Patent
Jain et al.

(10) Patent No.: US 9,749,202 B1
(45) Date of Patent: Aug. 29, 2017

(54) REMOTE SESSION PREVIEW MANAGEMENT

(71) Applicant: Amazon Technologies, Inc., Reno, NV (US)

(72) Inventors: Amit Santosh Jain, Seattle, WA (US); Dhruva Lakshmana Rao Batni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 587 days.

(21) Appl. No.: 14/180,245

(22) Filed: Feb. 13, 2014

(51) Int. Cl.
| | |
|---|---|
| G06F 15/16 | (2006.01) |
| H04L 12/26 | (2006.01) |
| H04L 29/08 | (2006.01) |
| H04L 29/06 | (2006.01) |
| G06F 17/30 | (2006.01) |

(52) U.S. Cl.
CPC ........ *H04L 43/04* (2013.01); *G06F 17/30899* (2013.01); *H04L 67/02* (2013.01); *H04L 67/2842* (2013.01); *H04L 67/42* (2013.01)

(58) Field of Classification Search
CPC ... H04L 67/02; H04L 67/2842; H04L 67/289; H04L 67/30; H04L 67/36; H04L 67/42; G06F 17/30899; G06F 17/30902; G06F 17/272; G06F 17/30873; G06F 3/0481; G06F 8/34; G06F 8/38; G06F 8/41
USPC ........ 709/201, 202, 203, 204, 217, 219, 200
See application file for complete search history.

(56) References Cited

U.S. PATENT DOCUMENTS

| | | | | |
|---|---|---|---|---|
| 5,973,696 | A | * | 10/1999 | Agranat .................... G06F 8/34 707/E17.118 |
| 6,012,083 | A | * | 1/2000 | Savitzky ................. G06F 17/21 707/999.01 |
| 6,237,030 | B1 | * | 5/2001 | Adams .............. G06F 17/30902 707/E17.12 |
| 2001/0037359 | A1 | * | 11/2001 | Mockett ............ G06F 17/30867 709/203 |

(Continued)

*Primary Examiner* — Edward Kim
(74) *Attorney, Agent, or Firm* — Knobbe Martens Olson & Bear LLP

(57) ABSTRACT

A previewing process is directed to the generation and management of a remote application session between a client computing device and one or more content providers in conjunction with a network computing provider, for previewing content at the client computing device. In one embodiment, the client computing device may request network content for preview. The network computing provider may obtain the request and instantiate a network-based browsing application corresponding to the preview request. The network computing provider may subsequently obtain the requested network content from the one or more content providers via the network-based browsing application, and may determine a preview configuration. The preview configuration may identify various processing actions, in accordance with which, the network computing provider can perform a first set of processing actions to generate and transmit a preview result to the client computing device. The preview result may include a preview representation of the requested network content. The preview representation can be presented by the client computing device, which may include the client computing device performing a second set of processing actions on the preview representation.

22 Claims, 13 Drawing Sheets

(56) References Cited

U.S. PATENT DOCUMENTS

| | | | |
|---|---|---|---|
| 2002/0023164 A1* | 2/2002 | Lahr | G06F 17/30899 709/231 |
| 2002/0032751 A1* | 3/2002 | Bharadwaj | H04L 29/06 709/218 |
| 2002/0038374 A1* | 3/2002 | Gupta | H04L 29/06027 709/231 |
| 2002/0112004 A1* | 8/2002 | Reid | H04L 12/1822 709/205 |
| 2002/0129114 A1* | 9/2002 | Sundaresan | G06F 3/0481 709/213 |
| 2007/0282945 A1* | 12/2007 | Bisht | G06F 17/30902 709/203 |
| 2014/0258371 A1* | 9/2014 | Hammersley | H04L 29/08072 709/203 |

* cited by examiner

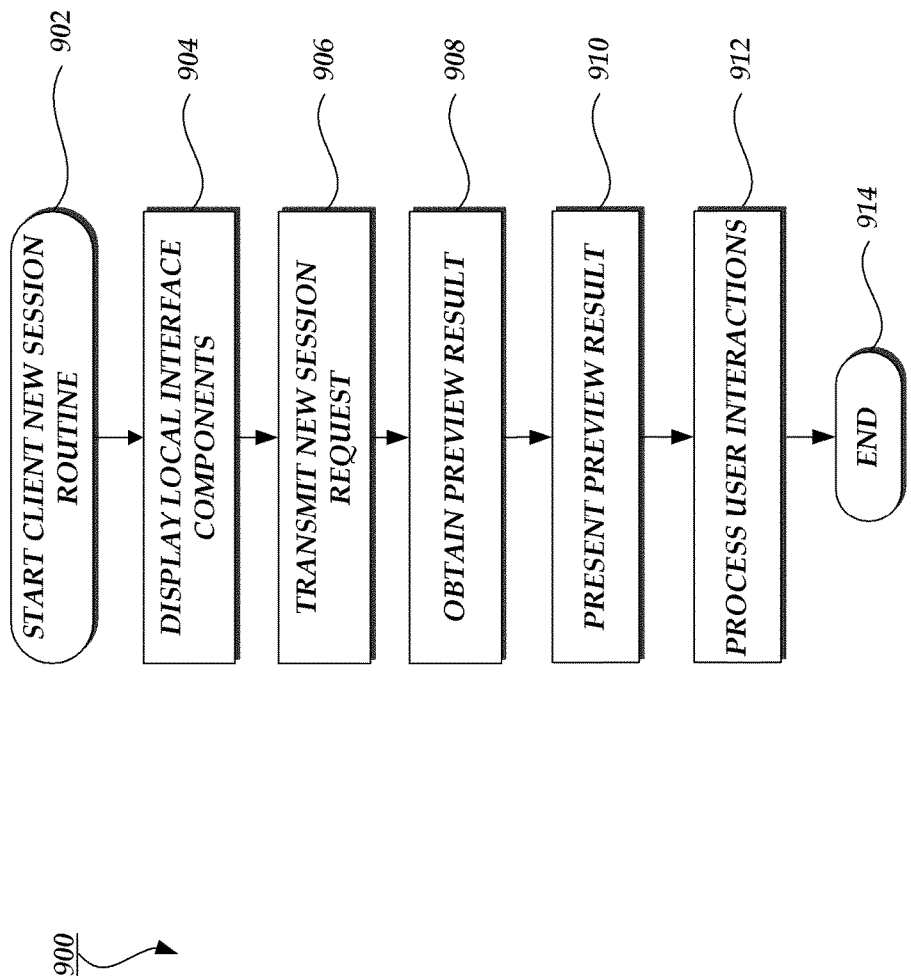

REMOTE SESSION PREVIEW MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser, to request a Web page from a server computing device via the Internet. In such embodiments, the user computing device can be referred to as a client computing device and the server computing device can be referred to as a content provider. Responsive to the requests from the user computing devices, content providers can deliver requested content to the user computing device via the communication network.

Depending on the network configuration and computational capabilities of the client computing device, the delivery and rendering of content, such as a Web page, at the client computing device can consume a considerable amount of time and computational resource. For example, a mobile computing device utilizing a limited bandwidth communication network may consume considerable computing and network resources to render a Web page, which can result in an unfavorable experience for a user. Additionally, the delivered content or associated user interactions can expose the client computing device to various security risks. Browser applications typically do not provide meaningful opportunities for a user to make informed decisions about the commitment of time, computational resource, or exposure to security risks prior to accessing network resources.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a flow diagram illustrative of a client new session routine implemented by a client computing device.

DETAILED DESCRIPTION

Figure 1:
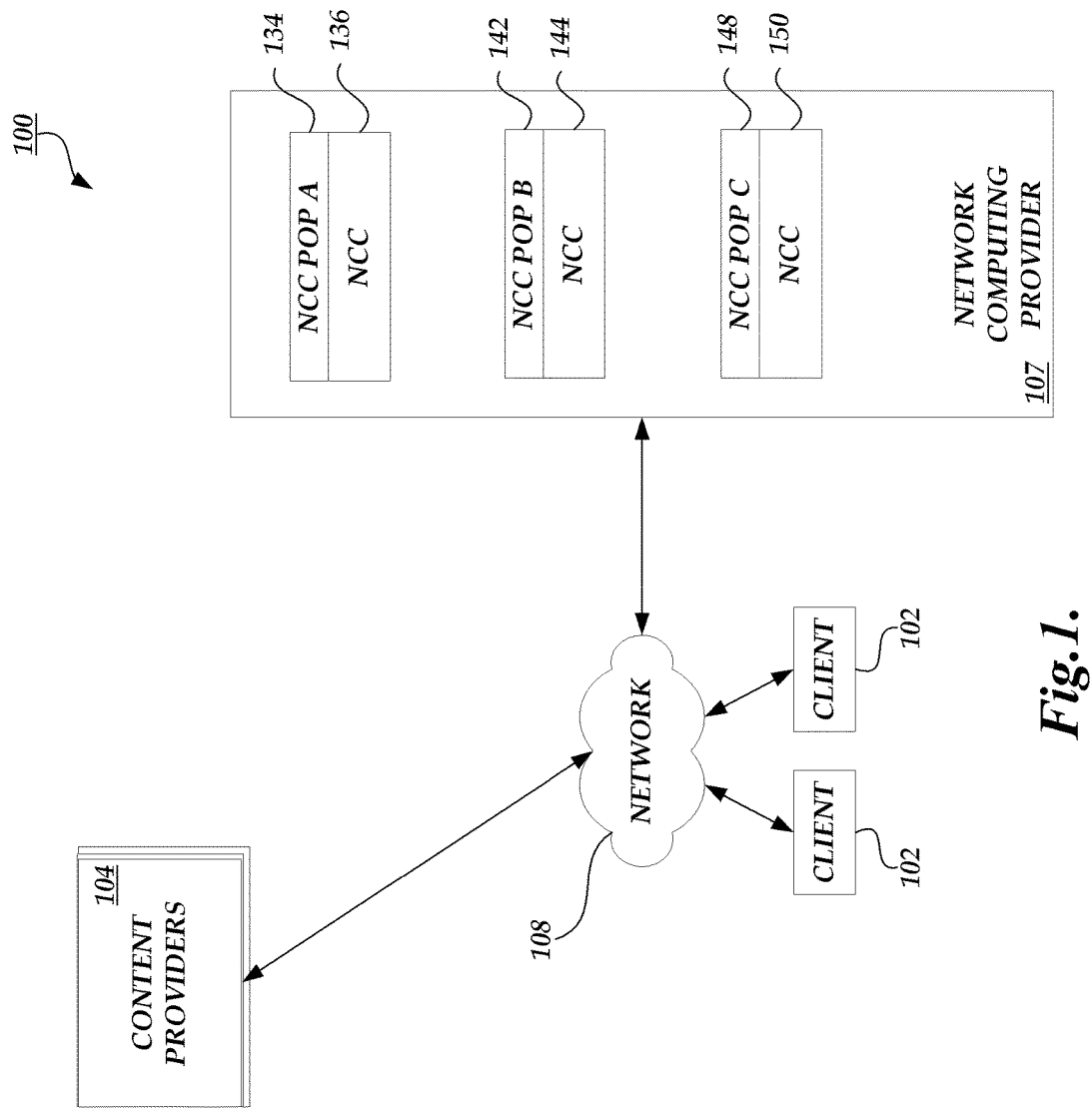
FIG. 1 is a block diagram illustrative of a content previewing environment including a number of client computing devices, content providers, and a network computing provider.

Generally described, the present disclosure is directed to the generation and management of a remote application session between client computing devices and content providers in conjunction with a network computing provider, for previewing network content on client computing devices. Specifically, aspects of the disclosure will be described with regard to the rendering of requested content in a network based application responsive to a request, providing the preview content without providing the requested content, and providing a mechanism to request the content. Although aspects of the embodiments described in the disclosure will focus, for the purpose of illustration, on the management of a remote session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user accesses a software preview application (hereinafter "previewer") for previewing network content, i.e., viewing, hearing or otherwise perceiving a preview representation of the network content without obtaining the network content itself. For example, a preview representation can be an image depicting a Web page. In one embodiment, the previewer is included or embedded within, or otherwise effectuated by a software browser application (hereinafter "browser"). The previewer may cause the client computing device to transmit a request for previewing content to a network computing provider. In response, the network computing provider may instantiate or cause to have instantiated a browser application. For example, the network computing provider can instantiate, or cause to have instantiated, an instance of a virtual machine that includes a browser capable of requesting resources from a communication network. Illustratively, in some situations, one or more devices associated with the network computing provider may be located in a data center or other robustly networked computing environment, and, as compared to the client computing device, may experience relatively little latency, delay, or security issues when obtaining network resources.

Using the instantiated network computing components, the network computing provider may request the identified network resources from one or more content providers, associated content delivery networks, or local or associated cache components. Illustratively, an identified network resource may reference embedded resources such as images, video, audio, text, executable code, and other resources. In this case, the browser on the instantiated network computing component can process a primary network resource and then generate additional requests for content identified by one or more embedded resource identifiers (e.g. pictures, video files, etc.). Illustratively, in the case of other, non-browser applications, network resources or content may include any file type or format known in the art and supported by the specific software application.

Having obtained the content requested for preview (e.g., the requested primary network resource and embedded resources), the network computing provider may identify a remote session preview configuration specifying one or more actions on the obtained content that are to be performed at the network computing provider, rather than at the client computing device. For example, in accordance with specified standards or requirements, the network computing provider converts the content into a preview representation and transmits the representation, associated user interaction specifications, or other information to the previewer being executed on the client computing device. More specifically, the requested content may need to be converted to and transmitted as one or more image files at a specified resolution in a specified format, such as certain JPEG files, organized in a specified fashion, with or without embedded portions that can facilitate user interactions at the client computing device, such as finger movements or touches on a touch screen, mouse movements or clicks, or text inputs.

In one embodiment, the identified remote session preview configuration may specify one or more actions that are applicable to a preview representation of content and that can be performed at the client computing device after it obtains the preview representation. For purposes of illustration, the preview representation of content, such as a set of images, may have embedded portions defined as related to, or corresponding to, interactive elements such as hyperlinks or search fields embedded in the corresponding content obtained by the network computing provider. The remote session preview configuration can specify actions that the client computing device may perform so that these embedded portions may receive user interactions such as finger movements or touches on a touch screen, mouse movements or clicks, or text inputs. User interactions and associated data, such as co-ordinates of affected pixels of an image or other identifiers of an embedded portion of the preview representation, may be translated at the client computing device into certain actions, information or data applicable the corresponding content obtained by the network computing provider, and then communicated to the network computing provider. Alternatively, or in additional, the user interactions and associated data may first be communicated to the network computing provider and translated there. The information exchanged between the network computing provider or its components, and the previewer on the client computing device can be generally referred to as "preview session information."

The translated user interaction data can initiate further actions at the network computing provider. For example, to request another network resource, such as a Web page, corresponding to a hyperlink or search input, to obtain content corresponding to the network resource, to convert the newly obtained content into another preview representation, and to transmit the preview representation to the previewer, in accordance with an identified remote session preview configuration. In some embodiments, the network computing provider can treat certain user interactions as a new session request, and reconfigure an instantiated network computing component or a hosted browser to perform the further actions. The network computing provider can also instantiate, or cause to have instantiated a new computing component to accomplish the further actions.

Although, various aspects of the disclosure will be described with regard to illustrative examples and embodiments, one skilled in the art will appreciate that the disclosed embodiments and examples should not be construed as limiting.

FIG. 1 is a block diagram illustrative of a networked computing environment 100 for the management and processing of content preview requests. As illustrated in FIG. 1, the networked computing environment 100 includes a number of client computing devices 102 (generally referred to as clients) for requesting content from content providers 104. In an illustrative embodiment, the client computing devices 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include one or more content providers 104 in communication with the one or more client computing devices 102, a network computing provider 107 or other service providers (e.g., content delivery network service providers.) via the communication network 108. Individual content providers 104 illustrated in FIG. 1 correspond to a logical association of one or more computing devices associated with a content provider. Specifically, the content provider 104 can include a Web server component corresponding to one or more server computing devices for obtaining and processing requests for content (such as Web pages) from the client computing devices 102, the network computing provider 107, or other service providers. The content provider 104 can further include an origin server component and associated storage component corresponding to one or more computing devices for obtaining and processing requests for network resources from an associated content delivery network service provider. The content provider 104 can still further include an application server computing device, such as a data streaming server, for processing streaming content requests. One skilled in the relevant art will appreciate that the content provider 104 can be associated with various additional computing resources, such as additional computing devices for administration of content and resources, DNS name servers, and the like. For example, the content provider 104 can be associated with one or more DNS name server components that would be authoritative to resolve client computing device DNS queries corresponding to a domain of the content provider.

With continued reference to FIG. 1, the networked computing environment 100 can also include a network computing provider 107 in communication with the one or more client computing devices 102 and the content providers 104 via the communication network 108. The network computing provider 107 illustrated in FIG. 1 also corresponds to a logical association of one or more computing devices associated with the network computing provider 107. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as software browser applications or data streaming applications, via a number of instances of a virtual machine, generally referred to as an instance of an NCC.

One skilled in the relevant art will appreciate that NCC 136, 144, 150 would include physical computing device resources, software and services to provide the multiple instances of a virtual machine or to dynamically cause the creation of instances of a virtual machine. Such creation can be based on a specific request, such as from a client computing device 102, or the NCC can initiate dynamic creation of an instance of a virtual machine on its own. Each NCC POP 134, 142, 148 can also include, or be associated with, a storage component made up of a number of storage devices for storing any type of data used in the delivery and processing of network or computing resources, including but not limited to user data, user interaction data, state information, processing requirements, historical usage data, and resources from content providers. The NCC POP 134, 142, 148 may further include additional software or hardware components that facilitate communications including, but not limited to, load balancing or load sharing software/hardware components for selecting instances of a virtual machine supporting a requested application and/or providing information to a DNS name server to facilitate request routing.

Although the NCC POPs 134, 142, 148 are illustrated in FIG. 1 as logically associated with a network computing provider 107, the NCC POPs can be geographically distributed throughout the communication network 108 in a manner to serve the needs of various demographics of client computing devices 102 or content providers 104. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 can be managed by the same or different entities.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content-related data between a client computing device 102 and content providers 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
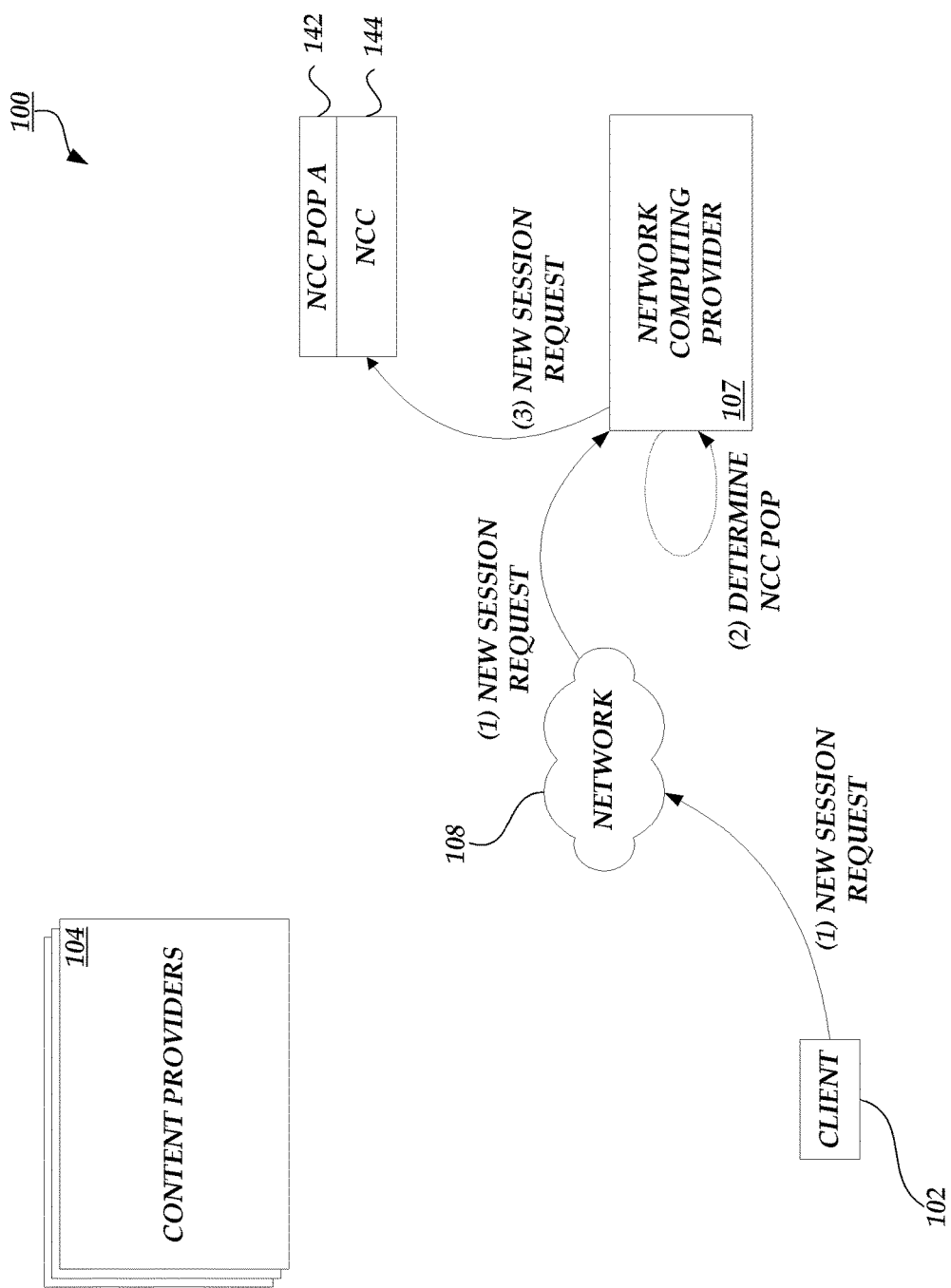
FIG. 2 is a simplified block diagram of the content previewing environment of FIG. 1 illustrating the generation and processing of a new session request for previewing content from a client computing device to a network computing provider.

With reference to FIG. 2, the generation and processing of a session request for previewing content from a client computing device 102 to a network computing provider 107 will be described. Illustratively, the client computing device 102 may load a previewer for previewing network content in response to an event or user request. Illustratively, the previewer can correspond to a generic browser for requesting content. Alternatively, the previewer may correspond to a specially configured browser that is configured to transmit requests for preview representations of network content. Accordingly, reference to a previewer includes any type of software application capable of receiving and processing preview representations of network content.

Subsequent to the previewer being loaded, the previewer may be implemented to request a new session for previewing content. From the perspective of the user of the client computing device 102, the request for the new session can correspond to the transmission of a content request to one or more content providers 104. Illustratively, this request may be generated automatically as a result of the previewer loading (e.g., a preview request for a default or "home" page), or may be generated as a result of a user following a link or entering a network address into an address bar in the previewer. In one embodiment, the session request can include an explicit request for a preview representation of the requested network resources. For example, the session request may include data that specifies whether network content identified in the request is to be previewed. Alternatively, the network computing provider 107 can use configuration information associated with a user or browser to determine that the new session request corresponds to a preview request. For example, the configuration information associated with a user or browser may include or reference a list of network resources that by default are to be previewed or browsed by the client, and the network computing provider 107 may compare one or more network resource identifiers specified by the request against the list and determine whether the session request is for the purpose of previewing content or whether one or more requested network resources should be provided to the previewer in the form of a preview representation.

As illustrated in FIG. 2, at (1), the session request is transmitted first to a network computing provider 107. In an illustrative embodiment, the network computing provider 107 utilizes a registration application program interface ("API") to accept session requests from the client computing device 102. The session request can include network address information corresponding to a network resource that is requested for previewing, which may be in any form, including, but not limited to, an Internet Protocol ("IP") address, a URL, a Media Access Control ("MAC") address, etc.

Subsequent to the receipt of the session request, at (2), the network computing provider 107 may select an associated network computing component (hereinafter "NCC") point of presence (hereinafter "POP") such as NCC POP 142 to service the session request. The selection of the NCC POP may determine the processing and network resources available to an instantiated virtual machine, or to instantiate a new virtual machine. The selection of processing and network resources and the provisioning of software at the NCC POP may be done, at least in part, in order to optimize communication with content providers 104 and client computing devices 102. At (3), the network computing provider 107 transmits the new session request to the selected NCC POP.

Figure 3:
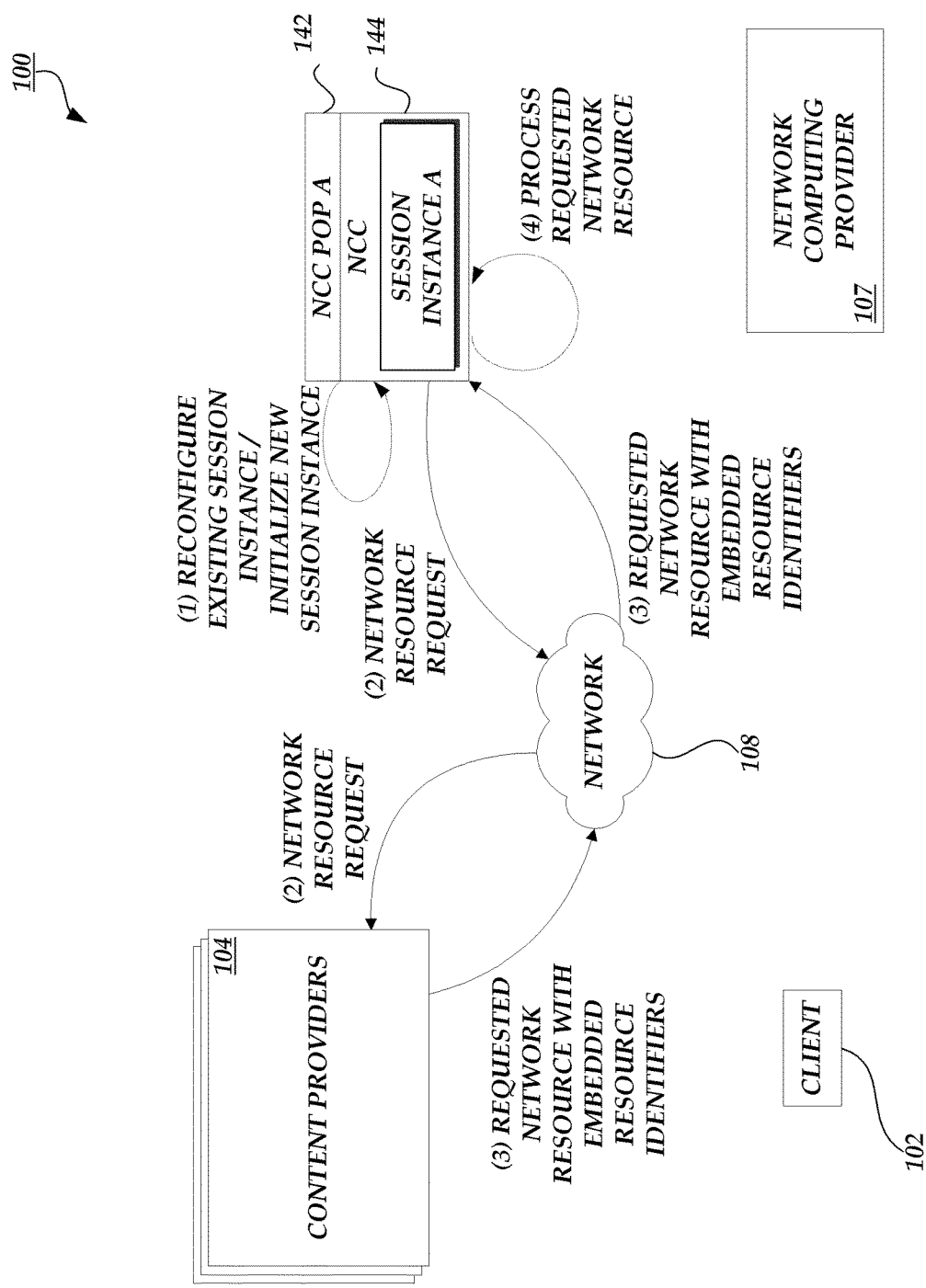
FIG. 3 is a simplified block diagram of the content previewing environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, at (1), the selected NCC POP 142 may reconfigure an existing session instance or generate a new session corresponding to the session request. Illustratively, instantiating a new session instance may include loading a new virtual machine instance and/or browser instance at the NCC POP 142, reserving or allocating device memory, storage or cache space, processor time, network bandwidth, or other computational or network resources for the new browse session.

Subsequent to reconfiguring an existing session instance or initializing a new session instance, at (2), the NCC POP 142 transmits a request for a network resource to a content provider 104 based on a network address included in the session request. For example, a session request may include a URL for a Web page, such as "http://www.xyzsite.com/default.htm." NCC POP 142 may resolve the URL to an IP address through a DNS resolver associated with the network computing provider 107, and may request the Web page from the content provider 104 at the resolved IP address. In various embodiments, a network resource may be retrieved from any combination of content providers, associated content delivery network (hereinafter "CDN") servers, or caches associated with the network computing provider 107. For example, the network computing provider 107 may check if a content item corresponding to the network resource is stored in a local cache or in another server or service provider associated with the network computing provider 107. If the content item is stored in a local or associated location, the NCC POP 142 may retrieve it from the local or associated location rather than from the third party content provider 104 or an associated CDN service provider. Illustratively, the NCC POP 142 may transmit requests for any number of network resources as included in the session request, and may obtain content corresponding to these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102, to facilitate the generation of a proper preview representation of the content at the network computing provider 107. For example, the content provider 104 may select the type of content, ordering of content, or version of content according to the requirements of the requesting client computing device 102. These requirements can be specified or derived from a corresponding session request from the client computing device 102. In another embodiment, the content provider 104 may be provided with information associated with the NCC POP 142, to be utilized in providing the requested content (e.g., an available amount of computational resources or network bandwidth). At (3), the content provider 104 provides the requested resource to the NCC POP 142.

Subsequent to obtaining the requested network resource from the content provider 104 (or other source designated by the content provider 104), at (4), the NCC POP 142 may process the network resource to extract embedded resource identifiers and gather information for determination of a remote session preview configuration. For example, a network resource, such as a Web page, may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session preview configuration as discussed below with reference to FIG. 4.

Figure 4:
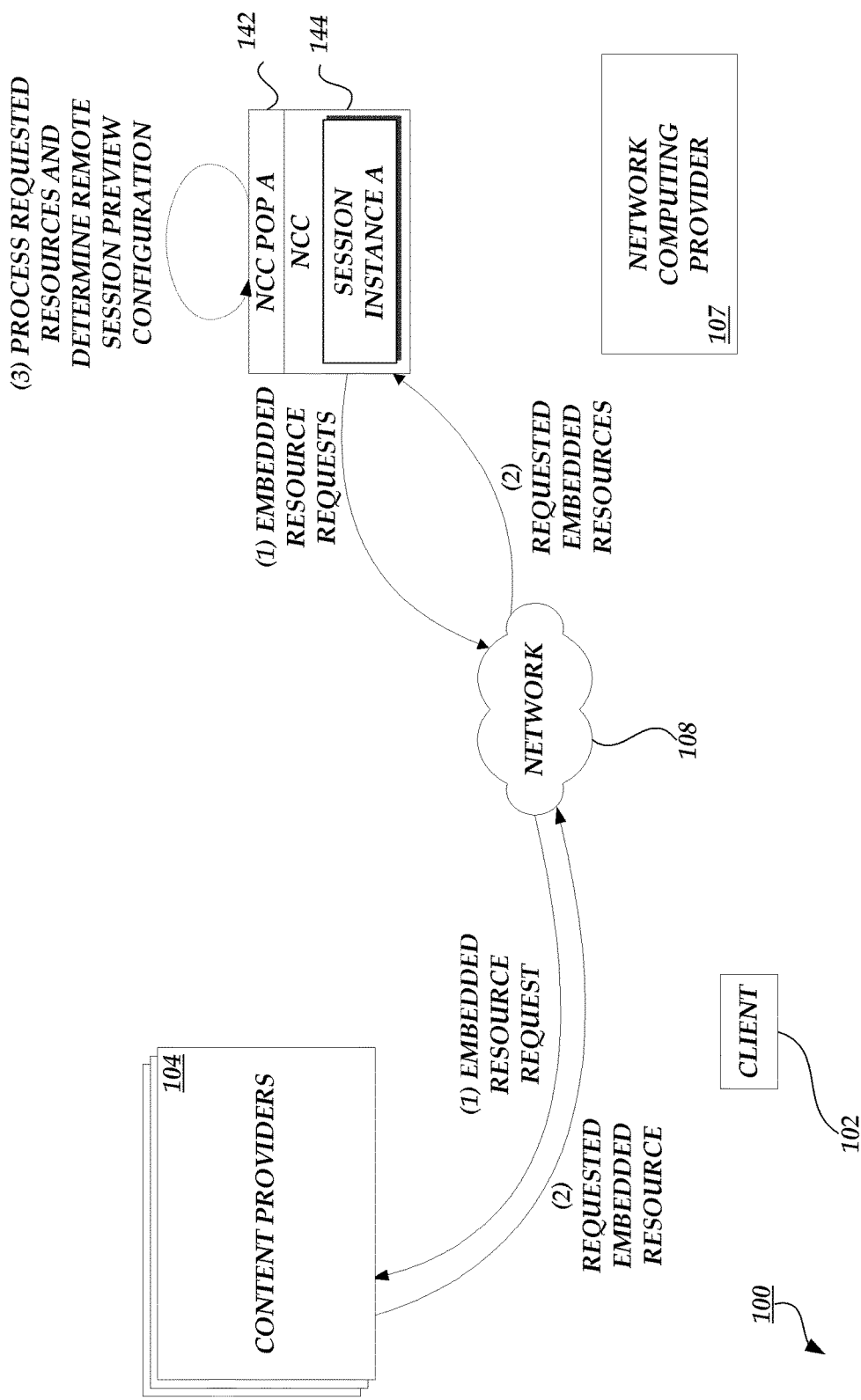
FIG. 4 is a simplified block diagram of the content previewing environment of FIG. 1 illustrating the generation and processing of one or more requests corresponding to one or more embedded resources from a network computing provider to one or more content providers.

With reference to FIG. 4, an illustrative interaction for generation and processing of one or more requests corresponding to one or more embedded resources from a network computing provider to a content provider and associated CDN service provider is disclosed. As illustrated in FIG. 4, at (1), the selected NCC POP 142 may transmit resource requests to one or more sources of content such as content provider 104 and associated CDN service provider. The resource requests may correspond to embedded resources based on one or more embedded resource identifiers extracted from a requested primary network resource (e.g., a Web page) as described in FIG. 3 above.

In various embodiments, at (2), the embedded resources may be transmitted from any combination of content providers, associated CDN servers, or caches associated with the network computing provider 107. For example, the network computing provider 107 may check if content corresponding to an embedded resource is stored in a local cache or in another server or service provider associated with the network computing 107. If the content is stored in a local or associated location, the NCC POP 142 may retrieve the content from the local or associated location rather than the third party content provider 104 or associated CDN servers. Illustratively, the NCC POP 142 may request any number of embedded resources referenced by a network resource or obtained content, and may obtain these embedded resources from any number of different sources, sequentially or in parallel.

At (3), subsequent to obtaining the requested resources, the NCC POP 142 may process the resources to determine a remote session preview configuration for processing corresponding content to generate a preview representation and communicating the preview representation to the client computing device 102. In some embodiments, a session request may indicate, that certain embedded resources need not be obtained for the purpose of generating a preview representation, in other words, only the primary resource and certain other embedded resources are requested for previewing. Alternatively, or in addition, the session request may indicate that relevant statistics or information of certain embedded resources be obtained and then communicated to the client computing device 102 in conjunction with the preview representation of the primary resource. These statistics or information may include the size, type, estimated loading time, security issues, etc., that are associated with the embedded resources.

Figure 5:
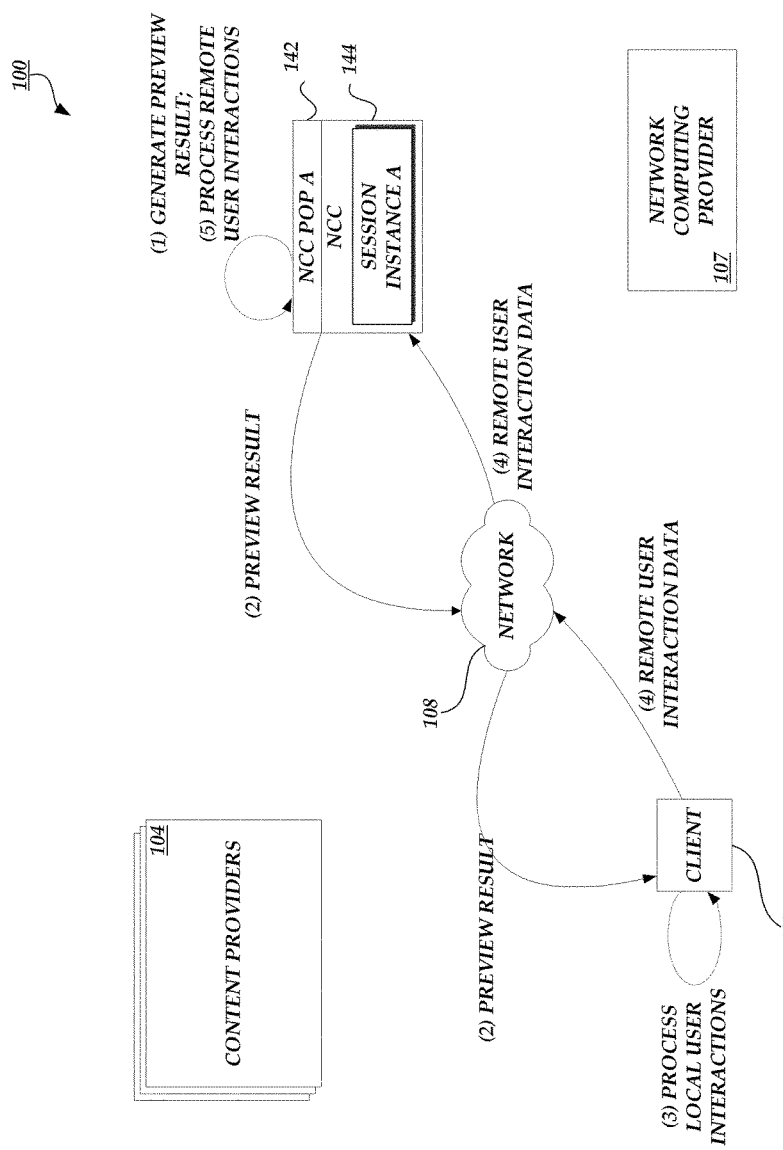
FIG. 5 is a simplified block diagram of the content previewing environment of FIG. 1 illustrating the generation and processing of content preview result and user interaction data between a network computing provider and client computing device.

With reference to FIG. 5, an illustrative interaction for generation of preview results and processing user interaction data between a network computing provider 107 and client computing device 102 is disclosed. As previously described, in one embodiment, the client computing device 102 and the browser on the instantiated network computing component can exchange preview session information related to the processing of obtained content at the instantiated network computing component and the processing of a preview representation of the content at the client computing device. As illustrated in FIG. 5, at (1), the selected NCC POP 142 generates a preview result. The preview result may include a preview representation of the obtained network content. For example, the preview result may be an image or set of images converted from a Web page with associated embedded resources processed by the NCC POP 142 in accordance with a remote session preview configuration as described above. The preview result may also include various information or statistics relating to a primary network resource or embedded resources.

At (2), the NCC POP 142 provides the preview result to the client computing device 102 via the network 108. Subsequent to receiving the preview result, at (3), the client computing device 102 may perform one or more processing actions on the preview representation as specified by the remote session preview configuration, and may display the preview representation in a preview display area of a previewer. The client computing device 102 may process any local user interactions with local interface components or content elements locally. At (4), the client computing device 102 may provide, with or without translation, user interactions requiring remote processing to the network computing provider 107 as previously described. At (5), the network computing provider 107 may obtain and process the user interactions, and if applicable, provide updated processing results to the client computing device 102 in response to the remote user interaction data from the client computing device 102.

Figure 6A:
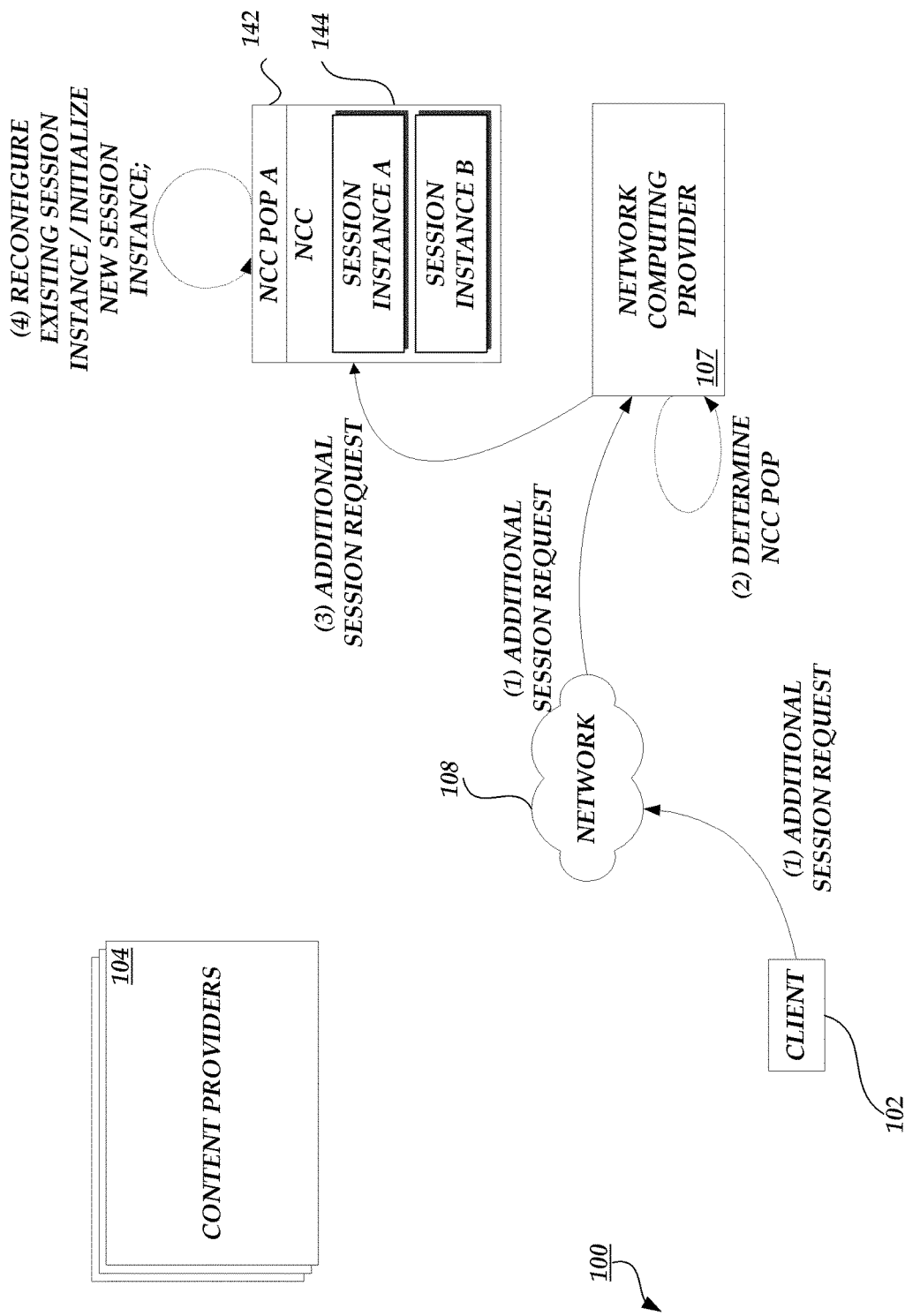
FIGS. 6A and 6B are simplified block diagrams of the content previewing environment of FIG. 1 illustrating two embodiments of the generation and processing of an additional new session request from a client computing device to a network computing provider.
Figure 6B:
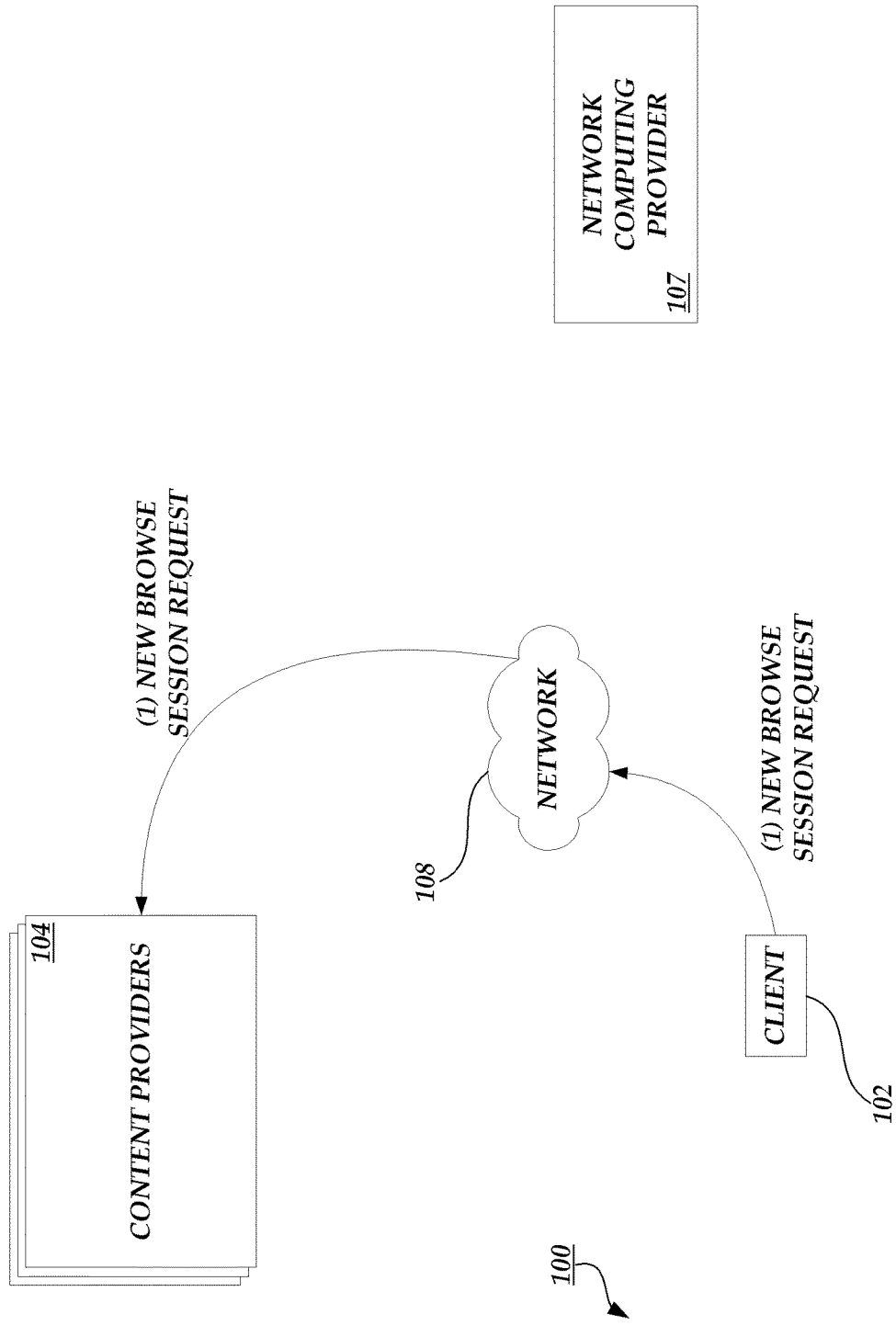

With reference to FIGS. 6A and 6B, block diagrams illustrative of a networked computing environment 100 of FIG. 1 illustrating the generation and processing of an additional session request from a client computing device 102 is disclosed. As illustrated in FIG. 6A, at (1), an additional session request may be sent to a network computing provider 107 from a client computing device 102 across a network 108. In an illustrative embodiment, the network computing provider 107 utilizes a registration API to accept the additional session request from the client computing device 102. The additional session request may be a session request for content previewing, or may be a regular content browsing request. As a session request for content previewing, it may be generated by a client computing device 102 in response to a user opening up a new previewer window with a new preview display area, opening a new preview display area in an existing previewer window (e.g., opening a new tab in a previewer), requesting to preview new network resource in an existing preview display area of a previewer window or an existing content display area of a browser, or any other user interaction. For example, a user previewing a first Web page via a first session may actuate an interactive portion of the preview representation that opens a new preview tab or previewer window for previewing a second Web page.

At (2), the network computing provider 107 determines an appropriate NCC POP to process the additional session request. At (3), the additional session request is transmitted to the selected NCC POP 142. At (4), any required steps of obtaining and processing content associated with the second Web page may, with applicable reconfiguration, be performed by the currently instantiated first session instance. In another embodiment, the additional session request may be processed as a new session request to the network computing provider 107, causing it to possibly instantiate a new session instance at the same or a different NCC POP, as described above with regard to FIGS. 2 and 3. In this embodiment, a user's interaction with the previewer representation on the client computing device 102 may still appear to be part of a same session.

As illustrated in FIG. 6B, the additional session request is a new session request for browsing, as opposed to, previewing content. In this case, at (1), the new browse session request is transmitted from the client computing device 102 to content providers 104, via a communication network 108, without being routed through the network computing provider 107.

Illustratively, the additional session request may include any number of pieces of data or information including, but not limited to, information associated with a user, information associated with user interaction with a preview representation of content, information associated with the client computing device 102 (e.g., hardware or software information, a device physical or logical location, etc.), information associated with the network 108, user or previewer preferences (e.g., a requested remote session preview protocol, a preference list, a decision tree, or other information), information associated with the network computing provider 107, information associated with one or more interactive areas of the preview representation, information associated with the requested network content (e.g., the network address of a network resource), etc. Content request for previewing may include any manner of digital content, including Web pages or other documents, text, images, video, audio, executable scripts or code, or any other type of digital resource.

FIGS. 7A-D are user interface diagrams depicting an illustrative previewer interface that displays a preview representation of content, relevant information and user interactions. As described above with reference to FIG. 5, a previewer 700 implemented on a client computing device 102 may have a preview display area 702, as well as one or more local interface components. These local interface components may include toolbars, menus, buttons, address bars, scroll bars, window resize controls, or any other user interface controls. With reference to FIGS. 7A-D, illustratively, the previewer 700 and a browser share a user interface and many local interface components. Certain local interface components may or may not be functional while under control of the previewer 700. Local interface components are displayed as separate from the preview display area 702 or may be overlaid or embedded in the preview display area 702.

User interactions with local interface components may be treated as local user interactions or remote user interactions depending on the processing required by the interaction, the identified remote session preview configuration, or information included in a preview result. For example, the processing required to display a menu or window, to provide visual feedback regarding a user selection may be performed locally. As another example, a preview result received by the client computing device 102 may consist of a preview representation completely stripped of any network resource information related to the corresponding content, and an identified remote session preview configuration may specify extensive translation and processing of user interaction data at the NCC POP 142.

Figure 7A:
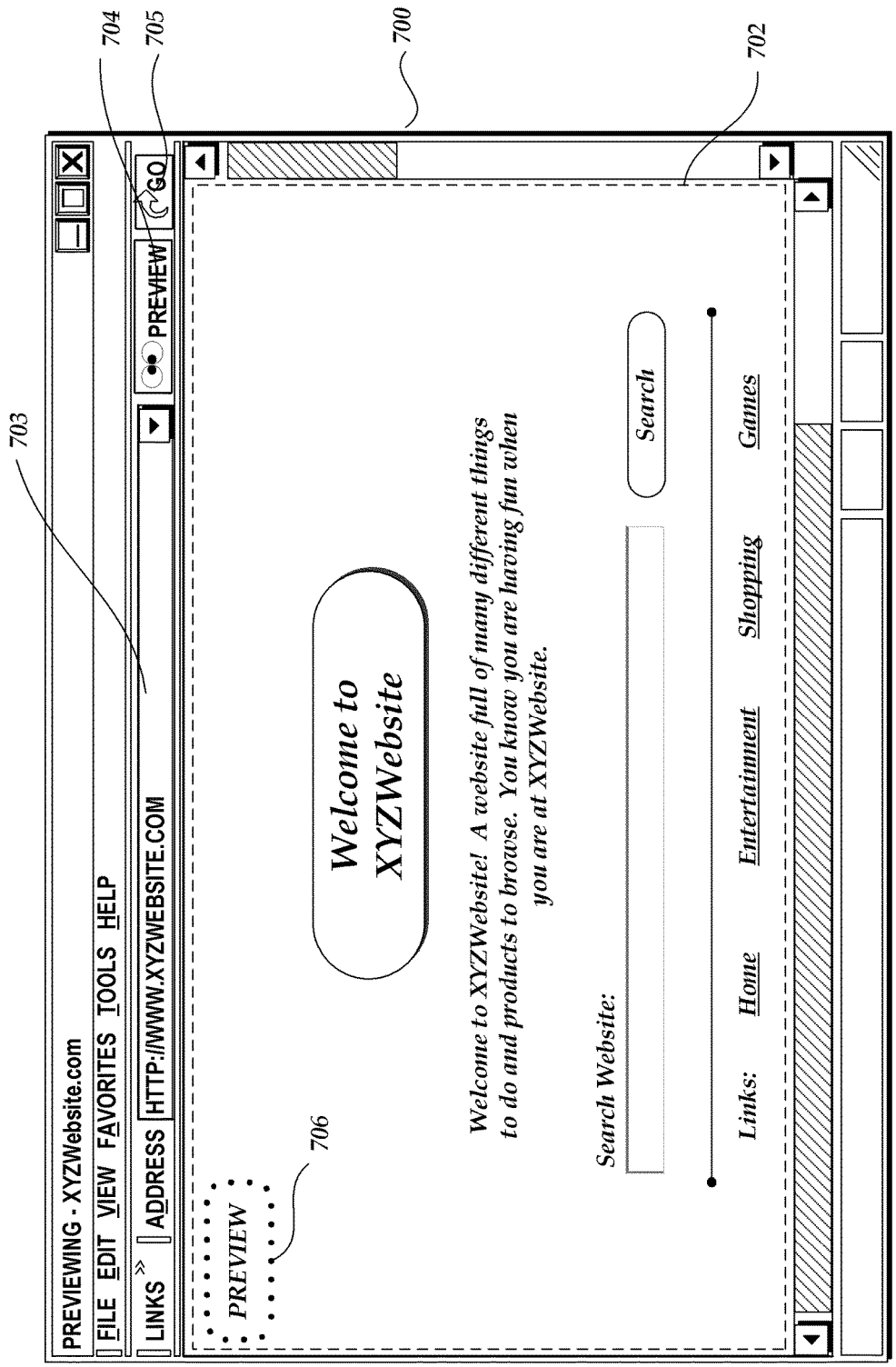
FIGS. 7A-D are user interface diagrams depicting an illustrative interface of a software preview application.

With reference to FIG. 7A, a preview indicator 706 can be overlaid in the preview display area 702 indicating that the area is currently displaying a preview representation of a Web page. The preview indicator 706 can also display statistics or information related to the network resource corresponding to the preview representation, such as the size, type, estimated loading time, or other information of the Web page.

A preview request button 704 is located next to an address bar 703. The preview request button 704, when activated, can cause the previewer 700 to transmit a new session request to a network computing provider 107 for content previewing. As described above with reference to FIG. 2, the request can include network resource identifiers such as a URL displayed in the address bar 703.

A content request button 705 is located next to the preview request button 704. The content request button 705 can be associated with a browser that shares the same user interface with the previewer 700. When activated, the content request button 705 can cause the browser to request content identified by a network resource identifier displayed in the address bar 703, which can be the same URL corresponding to the preview representation currently displayed.

Figure 7B:
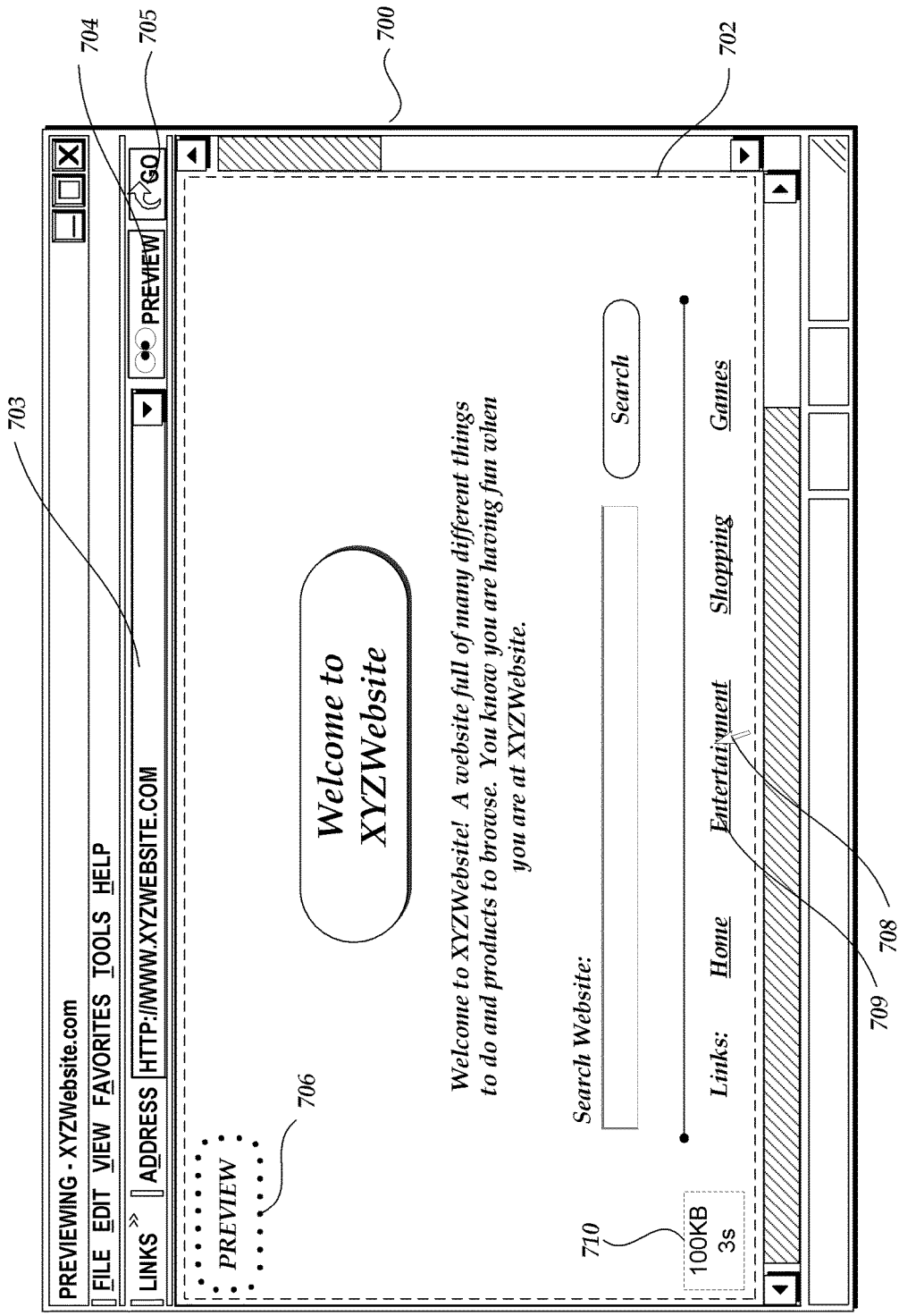

With reference to FIG. 7B, an information box 710 can be overlaid in the preview display area 700 when a user causes a finger or mouse indicator 708 to hover over an embedded interactive portion 709 of the preview representation. Illustratively, the information box 710 can display information or statistics related to a network resource corresponding to the finger or mouse pointed area, i.e., a Web page corresponding to a "Entertainment" hyperlink as illustrated in FIG. 7B. In one embodiment, the embedded interactive area 709 of the preview representation may not include the "Entertainment" hyperlink, or other network resource identifiers. Rather, user interactions with the interactive area 709 cause the information box 710 to display relevant information or statistics, which is included in a preview result provided by a network computing component to the client computing device, as described with FIG. 5.

Figure 7C:
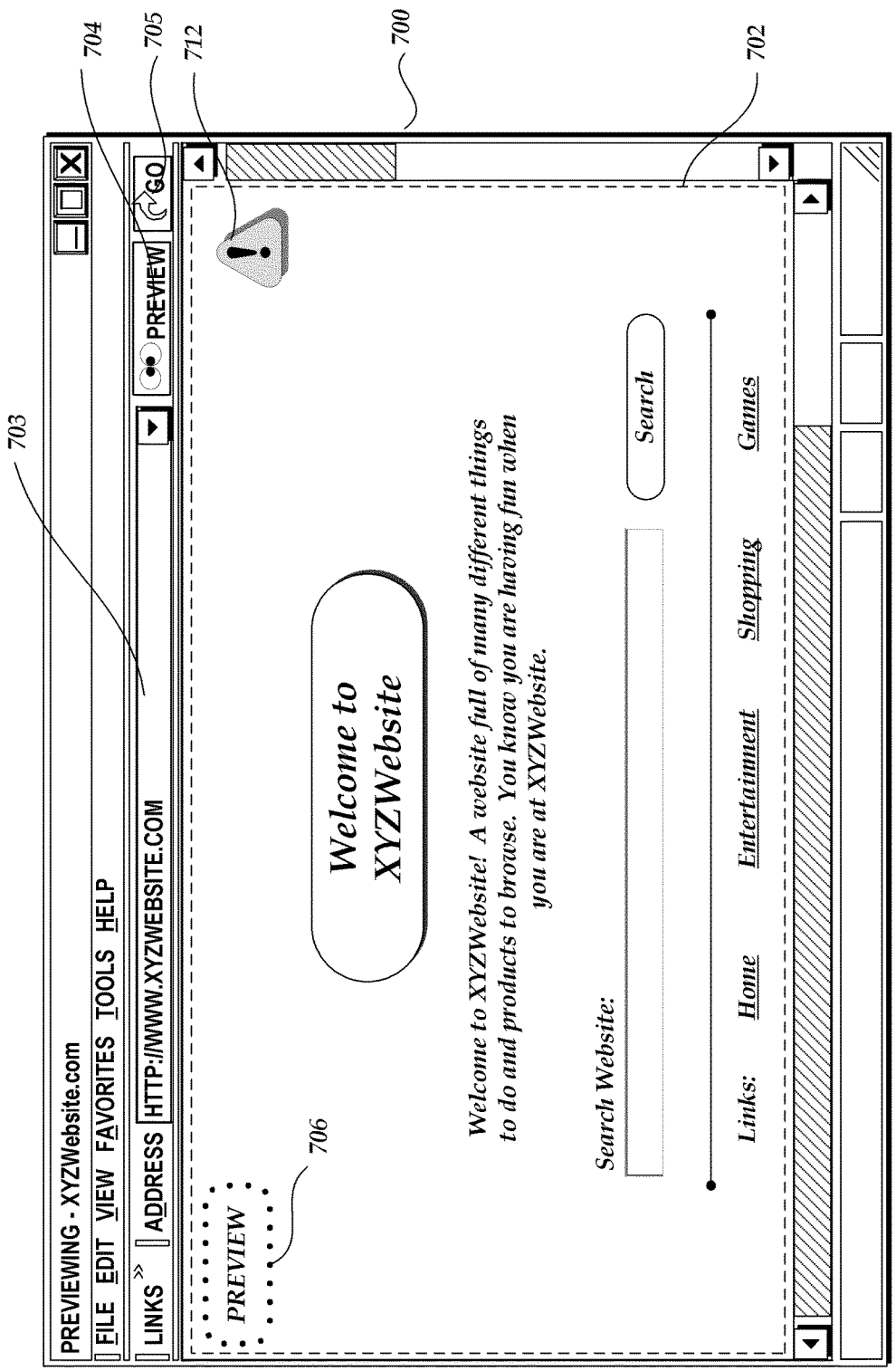

With reference to FIG. 7C, a security alert indicator 712 can be overlaid in the preview display area 702 indicating security issues related to the network resource corresponding to the preview representation currently displayed. The security alert indicator can display different colors or shapes corresponding to different levels or categories of security issue, and can also display detailed information related to the security alert.

Figure 7D:
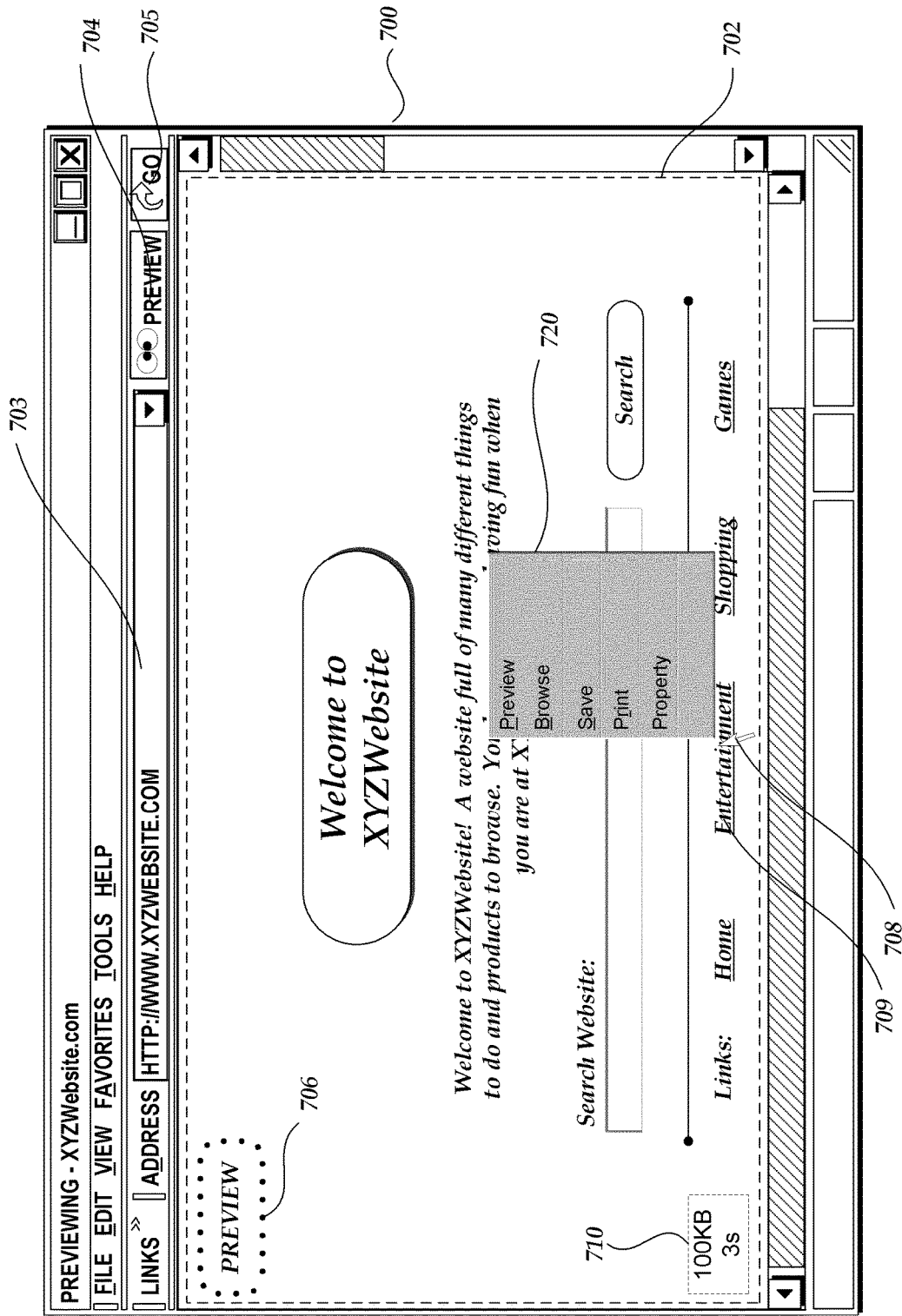

With reference to FIG. 7D, a pop-up menu 720 can be triggered to be displayed as overlaid in the preview display area 702, by a type of user interaction such as a mouse right-click, against the embedded interactive area 709. The pop-up menu 720 may include various options corresponding to actions applicable to the embedded interactive area 709 or a corresponding network resource. For example, the pop-up menu 720 can include options to preview a network resource corresponding to the interactive area 709. Illustratively, in one embodiment, when a user selects the preview option, the previewer 700 can transmit relevant user interaction data such as the type and location of the user interaction, to the NCC POP 142, which can further process the user interaction data and may translate it into an additional or new session request. In another embodiment, the preview result may include network resource identifiers corresponding to embedded interactive areas, and in accordance with a remote session preview configuration, the previewer 700 can process the user interaction data locally and initiate a new session request that indicates a corresponding network resource identifier, such as a URL corresponding to the "Entertainment" hyperlink.

Figure 8:
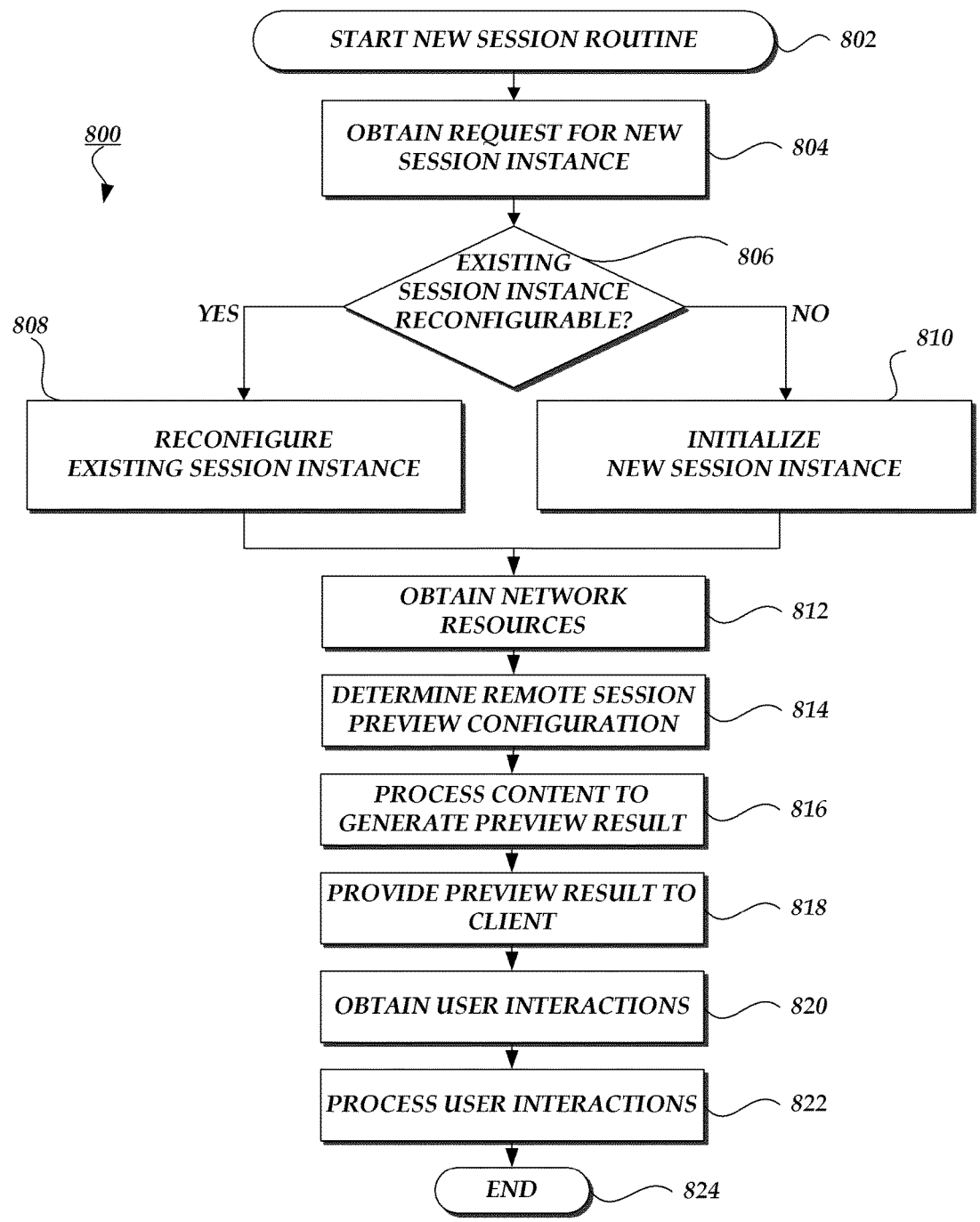
FIG. 8 is a flow diagram illustrative of a new session routine implemented by a network computing provider.

FIG. 8 is a flow diagram illustrative of a new session routine 800 implemented by network computing provider 107 of FIG. 1. New session routine 800 begins at block 802. At block 804, the network computing provider 107 receives a new session request for content previewing from a client computing device 102. As previously described, the client computing device 102 may load a previewer for previewing network content in response to an event or user request. Subsequent to the previewer being loaded, the previewer may request a new session. Illustratively, this request may be generated automatically as a result of the previewer loading (e.g., a request for a default or "home" page), or may be generated as a result of a user following a link or entering a network address into an address bar in a previewer window. This session request may include one or more addresses or references to various network resources or other content requested for preview by the client computing device 102. In an illustrative embodiment, the session request is transmitted in accordance with an API. In one embodiment, the session request can include an explicit request for a preview representation of the requested network resources. For example, the session request may include data that specifies whether network content identified in the request is to be previewed. Alternatively, the network computing provider 107 can use configuration information associated with a user or browser to determine that the new session request corresponds to a preview request. For example, the configuration information associated with a user or browser may include or reference a list of network resources that by default are to be previewed or browsed by the client, and the network computing provider 107 may compare one or more network resource identifiers specified by the request against the list and determine whether the session request is for the purpose of previewing content or whether one or more requested network resources should be provided to the previewer in the form of a preview representation.

At decision block 806, a determination is made whether an existing session instance associated with a NCC POP 142 can be reconfigured to service this request. If so, at block 808, the determined existing session instance is reconfigured based on the new session request. For example, the network computing provider 107 may cause the NCC POP 142 to associate an existing browser instance and/or virtual machine instance, such as one or more instances previously instantiated at the NCC POP 142, with the new session request. Illustratively, an existing browse session or virtual machine instance may correspond to another browse session, remote application session, or other remote process associated with the client computing device 102, or may be a previously instantiated software instance from an unrelated browse session or remote process.

If the network computing provider 107 cannot identify a reconfigurable session instance, at block 810, the network computing provider 107 may initialize a new session instance to service the request. For example, the network computing provider 107 may select an appropriate NCC POP to instantiate a new session to service the session request. As discussed above with reference to FIG. 1, a network computing provider 107 may include any number of NCC POPs distributed across any number of physical or logical locations. A network computing provider 107 may select a NCC POP to service a session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or a NCC POP cache status (e.g., whether a requested resource is already stored in an NCC POP cache), etc.

Subsequent to being selected by the network computing provider 107, NCC POP 142 may obtain the session request. In one embodiment, NCC POP 142 may have the session request forwarded to it by a component of the network computing provider 107. In another embodiment, NCC POP 142 or client computing device 102 may receive connection information allowing the establishment of direct communication between NCC POP 142 and the client computing device 102. Illustratively, NCC POP 142 may be provided with the session request originally provided to network computing provider 107, may be provided with a subset of information (e.g., just a network address of content requested for preview), or may be provided additional information not included in the original session request.

Subsequently, the network computing provider 107 may cause the NCC POP 142 to instantiate a new session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new virtual machine instance and/or browser instance may be based on client computing device 102 information included in the session request. For example, the session request may include a device type or previewer type, a device screen resolution, a specification of preview display area, or other information defining the preferences or capabilities of the client computing device 102 or previewer. The NCC POP 142 may accordingly instantiate a virtual machine instance and/or a browser instance compatible with the client computing device 102. Illustratively, maintaining a virtual machine instance and/or browser instance compatible with the client computing device 102 may allow the NCC POP 142 to process and convert network content according to the appropriate dimensions and layout for display of a preview representation of the network content on the particular client computing device 102.

At block 812, the network computing provider 107 obtains one or more primary and embedded network resources from a content provider 104 or associated CDN service provider based on a network address or other network identifiers included in the session request. In various embodiments, content corresponding to one or more of the network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. In some embodiments, a session request may indicate, that certain embedded resources need not be obtained. Alternatively, or in addition, the session request may indicate that information or statistics of certain embedded resources be obtained. The statistics or information may include the size, type, estimated loading time, security issues, etc., that are associated with the embedded resources.

At block 814, the network computing provider 107 may process obtained content and associated information, to determine a remote session preview configuration. A remote session preview configuration may include any proprietary or public remote protocol allowing exchange of data and user interactions or requests between a client and a remote server. The remote session preview configuration may illustratively include both a remote session communication protocol and a processing schema for processing the content, converting the content into a preview representation, and providing the preview representation for presentation by a previewer.

Illustratively, a remote session preview configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol.

The remote session preview configuration may define a set of processing actions to be performed by a component of the network computing provider (e.g., NCC POP 142) on the obtained content. For example, rendering the obtained content based on certain specification or criterion, and converting the rendered content into a preview representation, such as one or more image files, suitable for display in a preview display area of a previewer at the client computing device 102. The set of processing actions may also include defining and associating embedded interactive portions with the preview representation, attaching relevant information or statistics to the preview representation, etc. One of skill in the art will appreciate that, in the case of other embodiments or applications, various other processing actions may be required.

It should be noted that in some embodiments, the remote session preview configuration need not define the set of actions to be performed by the network computing provider. Obtained content is rendered and converted based on a default setting.

The remote session preview configuration may define a set of actions performable at the client computing device (e.g., client computing device 102) on the preview representation of the obtained content. For example, the remote session preview configuration may specify that various actions performable at the client computing device for properly display the preview representation, associated information and statistics, or embedded interactive area. The remote session preview configuration may also specify various actions to enable certain user interactions with the preview representation, including its embedded interactive areas. The remote session preview configuration may further define the mechanism or format, which the client computing device may utilize to communicate data related to user interactions with any component of the network computing provider (e.g., NCC POP 142).

Because the preview representation is distinct from the requested/obtained content, it may no longer contain relevant parts or information associated with the requested/obtained content. Further, the preview representation may not facilitate or support functionalities that are included or associated with the requested/obtained content. In some embodiments, the preview representation may not facilitate or support any such functionality. Accordingly, actions performable on the preview representation may not be applicable to the corresponding content itself. The converse is also true: actions performable on the requested/obtained content may not be applicable to its corresponding preview representation. For example, the preview representation may be a read-only screenshot image of a corresponding Web page request for preview. Actions performable on the preview representation may be strictly image operations, which are not applicable to a Web page. On the other hand, the corresponding Web page may contain texts, scripts, embedded media files, etc., which enable various actions that are not applicable to the preview representation—a read-only screenshot image.

The NCC POP 142 may base its determination of a remote session preview configuration on any number of factors, including, but not limited to, one or more characteristics of one or more of the requested resources, content provider 104 or associated CDN service provider, one or more characteristics of the content address or domain, one or more characteristics of the client computing device 102, previewer or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104 or associated CDN service provider, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session preview configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session preview configuration or level of service, a remote session preview configuration being used for another (or the current) browse session by the same user, or any other factor.

In some embodiments, an NCC POP 142 may base a determination of a remote session preview configuration on past behavior or practice. For example, an NCC POP 142 that has determined a remote session preview configuration for a particular resource in the past may automatically select the same remote session preview configuration when the resource is requested by the same (or potentially a different) user. In other embodiments, an NCC POP 142 may base a determination of a remote session preview configuration on predictions of future behavior. For example, an NCC POP 142 may base its determination of a remote session preview configuration for a particular resource on an analysis of past determinations made for a particular Web site, network domain, or set of related resources. A content provider that historically has provided video-heavy Web pages may be associated with a remote session review configuration that requires video sampling and conversion into image series. Illustratively, past historical analysis and future predictions may be considered as one or more of a number of factors on which to base the remote session preview configuration determination process, or may be definitive in the decision making process. For example, once an NCC POP 142 determines a remote session preview configuration for a particular content provider, it may skip the remote session preview configuration determination process for any future resources served from the content provider. Illustratively, the NCC POP 142 may re-determine a remote session preview configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote session preview configuration in a resource tag, metadata, or other communication with an NCC POP 142. The NCC POP 142 may treat the request as definitive, or may consider the request as one of multiple factors to be considered in the decision making process.

The determination of a remote session preview configuration can also be based on preferences provided by the client computing device 102. A client computing device 102 may illustratively include preferences for a remote session preview configuration in an initial session request for content previewing, or at any other time. The NCC POP 142 may utilize these preferences as an alternative to, or in addition to any other factor or decision metric. Illustratively, allowing the client computing device 102 to set or influence the selection of a remote session preview configuration allows the NCC POP 142 to take user preferences into account when determining a remote session preview configuration. For example, a user worried about preview load time and security risk may prefer to use a remote session preview configuration which only requires obtaining a primary network resource and converting it into a low resolution image at the NCC POP 142.

Illustratively, the NCC POP 142 may base a determination of a remote session preview configuration on any factor or combination of factors. For example, the NCC POP 142 may select a remote session preview configuration based on a single factor, or may assign weights to one or more factors in making a determination. In some embodiments, the determination process of the NCC POP 142 may change based on one or more factors described above.

Although the determination of a remote session preview configuration is illustratively depicted herein as occurring after all network resources and associated embedded content have been obtained by the NCC POP 142, one skilled in the relevant art will appreciate that the selection of a remote session preview configuration may be performed at any time. For example, the NCC POP 142 may select a remote session preview configuration after receiving a new session request or related information from the client computing device, may select a remote session preview configuration after obtaining a network resource, but before obtaining any associated embedded resources, or at any other time. In some embodiments, the NCC POP 142 may switch to a new remote preview configuration at some time subsequent to the client computing device 102 obtaining a preview result. Illustratively, the NCC POP 142 may automatically determine a new remote session preview configuration after a certain time period or event or in response to a change in network conditions, NCC POP 142 or client computing device 102 load or computing resources, or any other factor described above as potentially influencing the determination of remote session preview configuration.

It should be noted that in some embodiments, a determination of the remote session preview configuration is not required. The session for preview content may proceed based on a default configuration. For example, the network computing provider 107 renders and converts obtained content based on a default setting, such that a corresponding preview representation is always a read-only image file.

With continued reference to FIG. 8, at block 816, the network computing provider 107 may process the obtained content, including the one or more requested network resources and embedded network resources, to generate a preview result. The preview result may include a preview representation of the obtained content and other information to facilitate presentation and further processing of the preview representation. For example, it may indicate the layout or organization of a set of images that make up the preview representation, specify areas of interaction and their associated identifiers and other information or statistics about the primary content or any embedded content. At block 818, the network computing provider 107 may provide the preview result to the client for further processing and display in the preview display area of a previewer.

At block 820, the network computing provider 107 may obtain user interaction data from the client computing device 102. At block 822, the user interaction data is processed. If the user interaction data needs translation at the network computing provider 107, the data can be translated into actionable information or data with respect to corresponding network content from which the preview representation is generated. The user interaction data can initiate further actions at the network computing provider 107. For example, the user interaction data may cause the network computing provider 107 to request and obtain additional network resources corresponding to one or more hyperlinks or search inputs embedded in the corresponding network content, and to convert the further obtained network resource into preview representation and transmit the representation to a previewer at the client computing device 102, in accordance with the same or a different remote session preview configuration. In some embodiments, the network computing provider can treat certain user interactions as a new session request, and reconfigure an existing virtual machine or browse session instance to perform the further actions. The network computing provider can also instantiate, or cause to have instantiated a new computing component to accomplish the further actions. The start new session routine 800 ends at block 824.

FIG. 9 is a flow diagram illustrative of a client new session routine 900 implemented by a client computing device 102. New session routine 900 begins at block 902 in response to an event or user request causing the client computing device 102 to load a previewer for previewing network content. At block 904, the client computing device 102 displays locally managed components of the previewer, including all local interface components. As described above with reference to FIGS. 7A-7D, local interface components may include toolbars, menus, buttons, or other user interface controls managed and controlled by the software preview application or any other process executing or implemented locally at the client computing device 102.

At block 906, the client computing device 102 transmits requests for a new session to the network computing provider 107 for previewing the network content. Illustratively, the request may be generated automatically as a result of the previewer loading (e.g., a request for a default or "home" page), or may be generated as a result of a user following a link or entering a network address into an address bar in the previewer. As illustrated with respect to FIG. 2, the session request is transmitted first to the network computing provider 107. In an illustrative embodiment, the network computing provider 107 utilizes a registration API to accept session requests from the client computing device 102.

A session request for content previewing may include any number of pieces of data or information including, but not limited to, information associated with a user, information associated with the client computing device 102 or software on the client computing device (e.g., hardware or software information, a device physical or logical location, etc.), information associated with the network 108, user or previewer preferences, information associated with the network computing provider 107, information associated with one or more pieces of requested network content (e.g., the network address of a network resource), etc. For example, the session request can include information identifying a client computing device 102 screen resolution, aspect ratio, or previewer display area in the session request, to allow the network computing provider 107 to customize the processing and conversion of network content to a preview representation suitable for display on the client computing device 102. As previously described, the session request can include network address information corresponding to a requested network resource, which may be in any form including, but not limited to, an Internet Protocol ("IP") address, a URL, a Media Access Control ("MAC") address, etc. In one embodiment, the session request may correspond to the network computing provider obtaining a request for a new browse session instance at block 804 of FIG. 8 above. In one embodiment, the session request can include an explicit request for a preview representation of the requested network resources. For example, the session request may include data that specifies whether network content identified in the request is to be previewed. Alternatively, the network computing provider 107 can use configuration information associated with a user or browser to determine that the new session request corresponds to a preview request. For example, the configuration information associated with a user or browser may include or reference a list of network resources that by default are to be previewed or browsed by the client, and the network computing provider 107 may compare one or more network resource identifiers specified by the request against the list and determine whether the session request is for the purpose of previewing content or whether one or more requested network resources should be provided to the previewer in the form of a preview representation.

At block 908, the client computing device 102 obtains a preview result from the network computing provider 107. Illustratively, the format and content included in the preview result may vary based on the remote session preview configuration determined by the network computing provider 107. In one embodiment, the preview result may include or be preceded by data informing the client computing device 102 of the choice of remote session preview configuration. The obtained preview result may include a preview representation of the network content requested for preview and other information to facilitate presentation and further processing of the preview representation. For example, it may indicate the layout or organization of a set of images that make up the preview representation, specify areas of interaction and their associated identifiers and other information or statistics about a primary network resource or any embedded resources.

At block 910, the client computing device 102 may perform any processing actions on the preview representation, in accordance with determined remote session preview configuration. In one embodiment, the client computing device 102 displays the preview representation corresponding to the network content requested for preview. For example, the client computing device 102 may display the preview representation and relevant information, and may enable corresponding user interactions, in the preview display area 702 of a previewer 700 as described in FIGS. 7A-7D above.

At block 912, the client computing device 102 processes user interactions. Illustratively, the displayed preview representation may have one or more embedded interactive elements, such as defined areas of image, forms, buttons, animations, etc. User interaction with these interactive elements may generate user interaction data, such as the type, identifier, selection, text, or coordinates associated with the user interaction, with respect to the preview representation. In addition to a preview display area for displaying the preview representation, a previewer may have one or more local interface components, such as toolbars, menus, buttons, or other user interface controls. Interactions with local interface components may also generate corresponding user interaction data. Depending on the remote session preview configuration in use, such user interaction data may be translated at the client computing device 102 and communicated to the network computing provider 107, or communicated to and then translated at the network computing provider 107. The user interaction data can then be further processed at the network computing provider 107, in accordance with the remote session preview configuration. The client new session routine ends at block 914.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for remote session preview comprising:
   obtaining, by a first network based browser software application instantiated at a network computing component, a first network resource from a content provider based on a first identifier of the first network resource included in a first session request from a mobile computing device, wherein the first identifier references one or more embedded resource identifiers;
   determining, by the first network based browser software application, a first remote session preview configuration corresponding to the first session request, wherein the remote session preview configuration is determined at least in part on availability of a computing resource at the mobile computing device and an attribute of the first network resource and wherein the first remote session preview configuration defines at least a first set of processing actions to be applied to the first network resource and to be performed at the network computing component and a second set of processing actions applicable to a preview representation of the first network resource and performable at the mobile computing device;
   processing, by the first network based browser software application, the first network resource to perform the first set of processing actions identified by the first remote session preview configuration at the network computing component; and
   providing, by the first network based browser software application, a preview result corresponding to the preview representation to the mobile computing device, the client computing device configured to cause display of the preview representation of the first network resource.

2. The computer-implemented method of claim 1, wherein the second set of processing actions are not applicable to the first network resource.

3. The computer-implemented method of claim 1, wherein one of the second set of processing actions applicable to the representation of the first network resource, when performed by the mobile computing device, causes the mobile computing device to obtain the first network resource.

4. The computer-implemented method of claim 1 further comprising:
obtaining, by the first network based browser software application, user interaction data with respect to the preview representation, from the mobile computing device.

5. The computer-implemented method of claim 4 further comprising:
obtaining, by the first network based browser software application, a second session request based at least in part on the user interaction data; and
determining a second remote session configuration for the second session request, wherein the second remote session configuration is different than the first remote session preview configuration.

6. The computer-implemented method of claim 1 further comprising:
obtaining, by the first network based browser software application, a second session request from the mobile computing device, wherein the second session request comprises a second identifier of a second network resource and wherein the second network resource corresponds to an embedded resource identifier referenced by the first identifier of the first network resource;
obtaining, by the first network based browser software application, the second network resource; and
determining a second remote session preview configuration for the second session request.

7. The computer-implemented method of claim 1 further comprising:
obtaining, by a second network based browser software application instantiated at the network computing component, a second network resource from a content provider based on a second identifier of the second network resource included in a second session request from the mobile computing device; and
determining, by the second network based browser software application, a second remote session preview configuration corresponding to the second session request.

8. The computer-implemented method of claim 1, wherein the display of the preview representation of the first network resource includes statistics of at least one of the first network resource or a second network resource corresponding to an embedded resource identifier referenced by the first identifier of the first network resource.

9. A computer-implemented method for remote session preview comprising:
determining a first remote session preview configuration for a first network resource, wherein the first remote session preview configuration is determined at least in part on availability of a computing resource at a client computing device and an attribute of the first network resource and wherein the first remote session preview configuration defines at least a first set of processing actions to be applied to the first network resource and to be performed at a network computing component and a second set of processing actions applicable to a representation of the first network resource and performable at the client computing device;
processing the first network resource to perform the first set of processing actions identified by the first remote session preview configuration at the network computing component; and
providing the representation of the first network resource to the client computing device, the client computing device configured to cause presentation of the representation of the first network resource.

10. The computer-implemented method of claim 9, wherein the second set of processing actions are not applicable to the first network resource.

11. The computer-implemented method of claim 9, wherein determining the first remote session configuration comprises determining a remote session configuration based on at least one of client computing device configuration data, client computing device network configuration data, a resource data format, a resource content type, a resource size, resource processing requirements, resource latency requirements, a number or type of interactive elements, a resource security risk, historical resource usage data, resource usage predictions, an associated user preference, an associated network address, an associated network domain, historical content provider usage data, and content provider configuration data.

12. The computer-implemented method of claim 9 further comprising:
determining a second remote session configuration for a second network resource, wherein the second network resource is referenced by the first network resource;
processing the second network resource to generate a representation of the second network resource in accordance with the second remote session configuration; and
providing the representation of the second network resource to the client computing device, the client computing device configured to cause presentation of the representation of the second network resource.

13. The computer-implemented method of claim 9, wherein one of the second set of processing actions applicable to the representation of the first network resource, when performed by the client computing device, causes the client computing device to obtain the first network resource.

14. The computer-implemented method of claim 9, wherein determining the first remote session configuration includes determining the first remote session configuration based at least in part on a determination of a remote session configuration selected by the client computing device.

15. The computer-implemented method of claim 9, further comprising:
obtaining user interaction data with respect to the representation of the first network resource from the client computing device.

16. A system for remote session preview comprising:
a hardware processor and a memory for executing computer executable instructions, the computer executable instructions implementing a network computing component that is operable to:
obtain, by a first network based browser software application instantiated at the network computing component, a first network resource from a content provider based on a first identifier of the first network resource included in a first session request from a client computing device, wherein the first identifier references one or more embedded resource identifiers;
determine, by the first network based browser software application, a first remote session preview configuration corresponding to the first session request, wherein the first remote session preview configuration is determined at least in part on availability of a computing resource at the client computing device and an attribute of the first network resource and wherein the first remote session preview configuration defines at least a first set of processing actions to be applied to the first network resource and to be performed at the network computing component and a second set of processing actions applicable to a preview representation of the first network resource and performable at the client computing device, wherein the second set of processing actions are not applicable to the first network resource;

process, by the first network based browser software application, the first network resource to perform the first set of processing actions identified by the first remote session preview configuration at the network computing component; and provide, by the first network based browser software application, a preview result corresponding to the preview representation to the client computing device, the client computing device configured to cause presentation of the preview representation of the first network resource.

17. The system of claim 16, wherein one of the second set of processing actions applicable to the representation of the first network resource, when performed by the client computing device, causes the client computing device to obtain the first network resource.

18. The system of claim 16, wherein one of the second set of processing actions applicable to the representation of the first network resource, when performed by the client computing device, enables the client computing device to obtain user interaction data with respect to the preview representation of the first network resource.

19. The system of claim 18, wherein the user interaction data causes the presentation of the preview representation to include statistics of the first network resource.

20. The system of claim 18, wherein the user interaction data causes the presentation of the preview representation to include statistics of a second network resource corresponding to an embedded resource identifier referenced by the first identifier of the first network resource.

21. The system of claim 16, wherein the computer executable instructions implementing the network computing component that is further operable to:

obtain, by the first network based browser software application, user interaction data with respect to the preview representation, from the mobile computing device.

22. The system of claim 16, wherein the computer executable instructions implementing the network computing component that is further operable to:

obtain, by a second network based browser software application instantiated at the network computing component, a second network resource from a content provider based on a second identifier of the second network resource included in a second session request from the client computing device; and determine, by the second network based browser software application, a second remote session configuration corresponding to the second session request.

* * * * *